United States Patent [19]

Noguchi et al.

[11] Patent Number: 4,564,760

[45] Date of Patent: Jan. 14, 1986

[54] RADIATION IMAGE READ-OUT APPARATUS

[75] Inventors: Masaru Noguchi; Kazuo Horikawa; Akihiro Ohga, all of Kanagawa, Japan

[73] Assignee: Fuji Photo Film Co., Ltd., Kanagawa, Japan

[21] Appl. No.: 672,683

[22] Filed: Nov. 19, 1984

[30] Foreign Application Priority Data

Nov. 22, 1983 [JP] Japan ................... 58-218678

[51] Int. Cl.⁴ ............................................. G03G 5/16
[52] U.S. Cl. ................................. 250/327.2; 250/484.1
[58] Field of Search ......................... 250/327.2, 484.1

[56] References Cited

U.S. PATENT DOCUMENTS

| | | | |
|---|---|---|---|
| 4,239,968 | 12/1980 | Kotera et al. | 250/327.2 |
| 4,258,264 | 3/1981 | Kotera et al. | 250/484.1 |
| 4,302,671 | 11/1981 | Kato et al. | 250/327.2 |
| 4,346,295 | 8/1982 | Tanaka et al. | 250/327.2 |

Primary Examiner—Janice A. Howell
Attorney, Agent, or Firm—Murray, Whisenhunt & Ferguson

[57] ABSTRACT

A radiation image read-out apparatus comprises a stimulating ray optical system for exposing a stimulable phosphor carrying a radiation image stored therein to stimulating rays, a photodetector for detecting light emitted by the stimulable phosphor upon exposure to stimulating rays, and a light guide member for guiding the emitted light to the photodetector. A dichroic optical plane which selectively reflects either the stimulating rays or the light emitted by the stimulable phosphor and selectively passes the other is positioned in an optical path or the light guide member. The stimulating ray optical system is positioned so that the stimulating rays directly impinge upon the dichroic optical plane and come out of a light input face of the light guide member positioned close to the stimulable phosphor by being reflected by or passed through the dichroic optical plane.

8 Claims, 12 Drawing Figures

RADIATION IMAGE READ-OUT APPARATUS

BACKGROUND OF THE INVENTION

1. Field of the Invention

This invention relates to a radiation image read-out apparatus for exposing a stimulable phosphor carrying a radiation image of an object such as the human body stored therein to stimulating rays which cause the stimulable phosphor to emit light in proportion to the radiation energy stored, guiding the emitted light to a photodetector via a light guide member, and obtaining an electric signal representing the radiation image.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed, for example, in U.S. Pat. No. 4,239,968, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image thereof stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image of the object on a recording medium such as a photographic light-sensitive material or on a display device such as a cathode ray tube (CRT).

The radiation image read-out apparatus used in the aforesaid radiation image recording and reproducing system comprises a stimulating ray optical system for exposing a stimulable phosphor carrying a radiation image stored therein to stimulating rays, a photodetector for detecting light emitted by the stimulable phosphor upon exposure to the stimulating rays, and a light guide member for guiding the emitted light to the photodetector. One end face of the light guide member is positioned close to the stimulable phosphor, and the other end face thereof is optically connected to the photodetector.

In the aforesaid radiation image recording and reproducing system, the energy of the light emitted by the stimulable phosphor sheet when it is exposed to stimulating rays is very much smaller than the energy of stimulating rays (approximately $10^{-5}$ times the energy of stimulating rays), and the emitted light is non-directional. Therefore, when the read-out apparatus is fabricated, the light receiving solid angle of the light guide member should be made as large as possible to guide as much emitted light as possible and improve the S/N ratio.

Accordingly, the applicant proposed in U.S. Pat. No. 4,302,671 to provide the light receiving face of the photodetector, which is positioned close to a stimulable phosphor sheet in face-to-face relation, with a reflecting mirror or a triangular prism sufficiently smaller than the area of the light receiving face of the photodetector so that the reflecting mirror or the triangular prism protrudes from the light receiving face. In this technique, stimulating rays such as a laser beam incident laterally and exhibiting high directivity are reflected by the reflecting mirror or the triangular prism onto the stimulable phosphor sheet. However, in this case, a space at least equal to the amount of protrusion of the reflecting mirror or the triangular prism must be left between the light receiving face and the stimulable phosphor sheet. Therefore, the light receiving solid angle of the light guide member becomes small.

The applicant also proposed in U.S. Pat. No. 4,346,295 to position a light guide member having a special shape so that one end face (light input face) is close to a stimulable phosphor sheet in face-to-face relation thereto along a scanning line of stimulating rays, and to guide light emitted by the stimulable phosphor sheet upon stimulation thereof to a photodetector by use of the light guide member. However, in this case, since it is necessary to prevent interference between the stimulating rays and the light guide member, it is impossible to cover the whole area above the scanning line by the light input face of the light guide member and to make the light receiving solid angle sufficiently large.

Therefore, in aforesaid U.S. Pat. No. 4,346,295, the applicant further proposed to position a light reflecting means standing face to face with the light input face of the light guide member so that light emitted by the stimulable phosphor sheet in the direction opposite to the light input face is reflected by the light reflecting means and guided to the light input face. However, even in this technique, a space for passing the stimulating rays must be left between the light input face of the light guide member and the light reflecting means, and the problem that a part of the light emitted by the stimulable phosphor sheet is lost is not solved.

As described above, in the conventional radiation image read-out apparatuses, since a part of the light emitted by the stimulable phosphor sheet is lost without being detected, the amount of the stimulating rays must be made large for increasing the amount of light emitted by the stimulable phosphor sheet, and the stimulating ray source becomes large. Also, for the same reason, the scanning speed is limited.

SUMMARY OF THE INVENTION

The primary object of the present invention is to provide a radiation image read-out apparatus wherein the solid angle for receiving light emitted by a stimulable phosphor sheet upon stimulation thereof is made sufficiently large, and nearly all emitted light is received and detected.

Another object of the present invention is to provide a radiation image read-out apparatus wherein the S/N ratio is improved, the stimulating ray source is made small, and the scanning speed is increased.

The present invention provides a radiation image read-out apparatus provided with a stimulating ray optical system for exposing a stimulable phosphor carrying a radiation image stored therein to stimulating rays, a photodetector for detecting light emitted by the stimulable phosphor upon exposure to said stimulating rays, and a light guide member for guiding the emitted light to said photodetector, said light guide member having one end face positioned close to the stimulable phosphor and the other end face optically connected to said photodetector, wherein the improvement comprises:

(i) positioning a dichroic optical plane, which selectively reflects either said stimulating rays or said light emitted by the stimulable phosphor and selectively passes the other, in an optical path of said light guide member, and (ii) positioning said stimulating ray optical system so that said stimulating rays directly impinge upon said dichroic optical plane and come out of said one end face of said light guide member positioned close to the stimulable phosphor by being reflected by said dichroic optical plane or by passing therethrough, thereby stimulating the stimulable phosphor.

In the present invention, a dichroic optical plane is positioned in an optical path of a light guide member for guiding the light, which is emitted by a stimulable phosphor when it is exposed to stimulating rays, to a photodetector and the stimulating rays are made to impinge upon the stimulable phosphor from an end face of the light guide member standing face to face with the stimulable phosphor. Therefore, it is possible to gather light emitted by the stimulable phosphor into the light guide member from the entire end face thereof covering the light emitting portion of the stimulable phosphor, and the solid angle at which the emitted light is received by the end face of the light guide member becomes large. When the end face of the light guide member is positioned closer to the stimulable phosphor, the light receiving solid angle is further increased, and it becomes possible to receive almost all light emitted by the stimulable phosphor toward the light guide member. Accordingly, it becomes possible to improve the S/N ratio. Also, since the amount of light received by the light guide member increases, it is possible to decrease the amount of stimulating rays and to make the stimulating ray source smaller than in the conventional apparatus while the S/N ratio is maintained on the same level. Further, in the case where the same stimulating ray source is used, it becomes possible to increase the scanning speed.

DESCRIPTION OF THE PREFERRED EMBODIMENTS

The present invention will hereinbelow be described in further detail with reference to the accompanying drawings.

Figure 1:
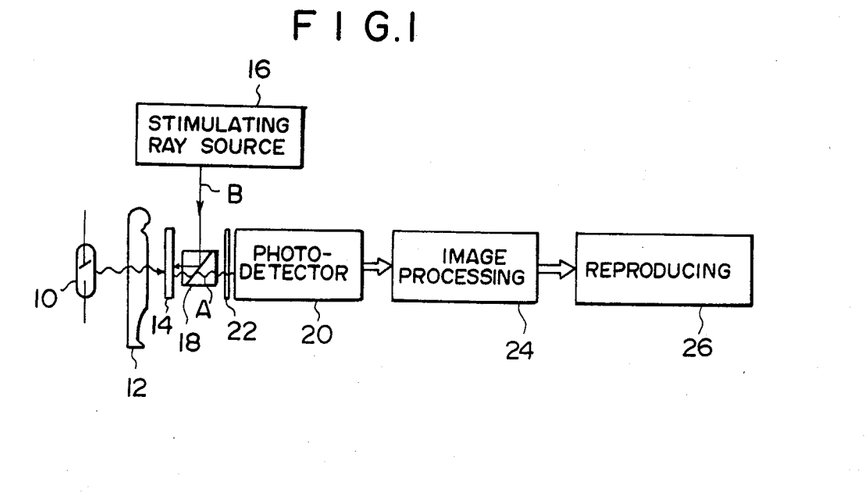
FIG. 1 is a schematic view showing the basic configuration of an X-ray image recording and reproducing system in which the radiation image read-out apparatus in accordance with the present invention is employed.

FIG. 1 shows the basic configuration of the X-ray image recording and reproducing system in which the radiation image read-out apparatus in accordance with the present invention is employed. X-rays emitted by an X-ray tube 10 pass through an object 12 such as a patient to an extent depending on the difference in the X-ray transmittance between portions of the object 12. The X-rays impinge upon a stimulable phosphor sheet 14, and X-ray energy is stored therein in accordance with the amount of X-rays impinging thereupon. That is, a latent X-ray image is stored in the stimulable phosphor sheet 14. The stimulable phosphor constituting the stimulable phosphor sheet 14 may, for example, be a rare earth element activated alkaline earth metal fluorohalide phosphor as disclosed in U.S. Pat. No. 4,239,968. When this phosphor is exposed to stimulating rays, it emits light A having a wavelength within the range of 300 nm to 500 nm.

The stimulable phosphor sheet 14 carrying the latent X-ray image stored therein is then exposed to stimulating rays B emitted by a stimulating ray source 16. In order to facilitate separation from the light A emitted by the stimulable phosphor sheet 14 upon stimulation thereof, the wavelength distribution of the stimulating rays B should be different from and far apart from the wavelength distribution of the light A emitted by the stimulable phosphor sheet 14. Namely, the spectrum of the stimulating rays B should not overlap the spectrum of the light A emitted by the stimulable phosphor sheet 14. Accordingly, the stimulating rays B should preferably be a He-Ne laser beam (633 nm), a YAG laser beam (1064 nm), a ruby laser beam (694 nm), a semiconductor laser beam (700–1300 nm), or the like, which has a wavelength longer than that of the light A emitted by the stimulable phosphor sheet 14.

The stimulating rays B are passed through a light guide member 18 as described later and are made to impinge upon the stimulable phosphor sheet 14. The light A emitted by the stimulable phosphor sheet 14 when it is exposed to the stimulating rays B is passed through the light guide member 18 and is guided to a photodetector 20. As the photodetector 20, a photomultiplier should preferably be used. The light guide member 18 is provided with a dichroic optical plane for separating the stimulating rays B from the light A emitted by the stimulable phosphor sheet 14. In the case where the separation is incomplete and the stimulating rays B slightly enter the photodetector 20, a filter 22 for selectively passing only the light A emitted by the stimulable phosphor sheet 14 should preferably be positioned at the light receiving face of the photodetector 20.

The light A detected by the photodetector 20 is converted thereby into an electric image signal, which is then electrically processed by an image processing device 24 and is used in a reproducing device 26 to reproduce a visible image in a recording material such as a photographic film or on a display device such as a CRT.

Figure 2:
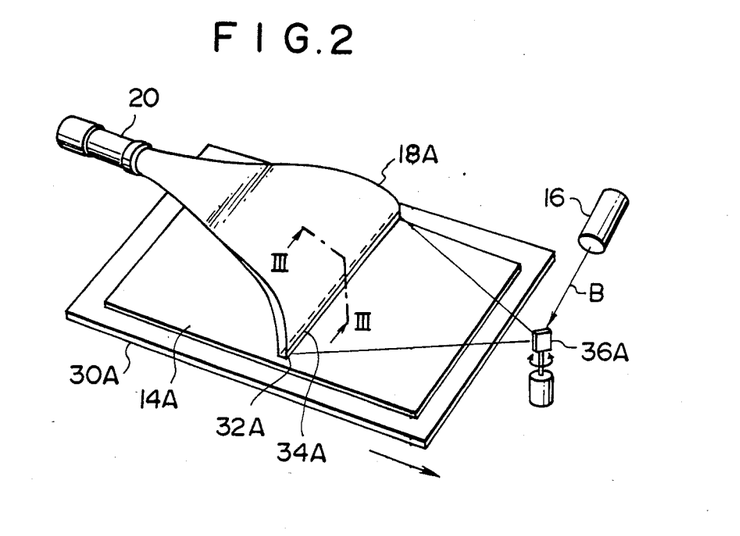
FIG. 2 is a perspective view showing an embodiment of the radiation image read-out apparatus in accordance with the present invention.
Figure 3:
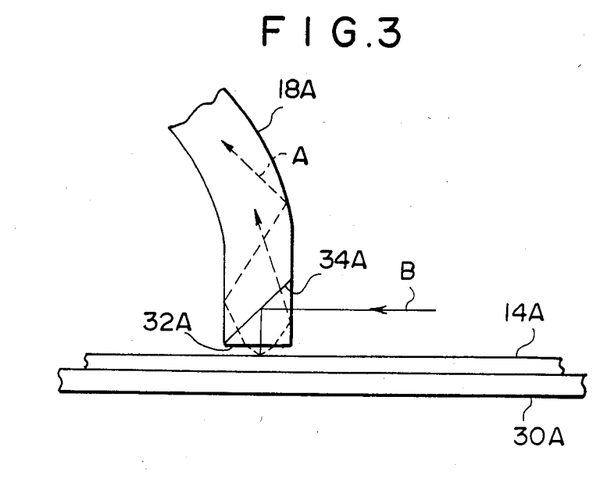
FIG. 3 is a sectional view taken along line III—III of FIG. 2.

FIG. 2 is a perspective view showing an embodiment of the radiation image read-out apparatus in accordance with the present invention, and FIG. 3 is a sectional view taken along line III—III of FIG. 2. In this embodiment, a stimulable phosphor sheet 14A is supported on a flat platelike feed base 30A. A light guide member 18A is fabricated into a gradually bent sheet shape by use of a transparent material such as glass or an acrylic resin sheet. The light guide member 18A is positioned so that one end face (light input face) 32A extends normal to the feed direction of the feed base 30A and stands face to face with and close to the surface of the stimulable phosphor sheet 14A approximately in parallel thereto.

Figure 4:
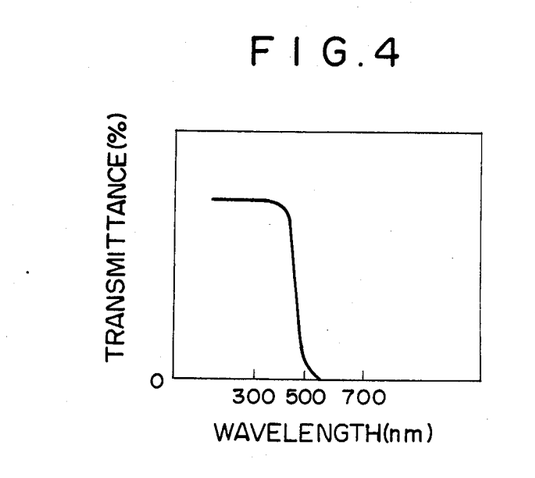
FIG. 4 is a graph showing the spectral characteristics of the dichroic optical plane in the apparatus of FIG. 2.

The other end (light output face) of the light guide member 18A is ring-shaped to match the shape of the light receiving face of the photodetector 20. As shown in FIG. 3, a dichroic optical plane 34A is longitudinally positioned at the end portion on the light input face 32A side of the light guide member 18A at an angle of 45° with respect to the light input face 32A. The dichroic optical plane 34A is incorporated by dividing the end portion on the light input face 32A side of the light guide member 18A along a plane at an angle of 45° with respect to the light input face 32A, overlaying a plurality of films, for example, of a high refractive index material and a low refractive index material on the division surface, and then joining the divided portion to the light guide member 18A. The dichroic optical plane 34A exhibits spectral chracteristics as shown in FIG. 4 when the angle of incidence is 45°, and should preferably exhibit a high trasmittance with respect to the light A emitted by the stimulable phosphor sheet 14A over as wide range of incidence angle as possible around an angle of incidence of 45°.

The stimulating rays B emitted by the stimulating ray source 16 impinge upon the dichroic optical plane 34A approximately in parallel with the stimulable phosphor sheet 14A, and are swung by a light deflector 36A so as to scan the dichroic optical plane 34A. In order to make the stimulating rays B impinge upon the dichroic optical plane 34A approximately at a predetermined angle, a lens or a concave mirror may be positioned between the light deflector 36A and the dichroic optical plane 34A.

In the aforesaid embodiment, the stimulating rays B impinge upon the dichroic optical plane 34A laterally at an angle of incidence of 45°, and are almost entirely reflected by the dichroic optical plane 34A onto the stimulable phosphor sheet 14A via the light input face 32A of the light guide member 18A. When exposed to the stimulating rays B, the stimulable phosphor sheet 14A emits the light A in proportion to the X-ray energy stored therein. Since the area above the light emitting portion of the stimulable phosphor sheet 14A is sufficiently covered by the light input face 32A, nearly all of the light A emitted upwardly by the stimulable phosphor sheet 14A enters the light guide member 18A from the light input face 32A together with a part of the stimulating rays B reflected by the surface of the stimulable phosphor sheet 14A. The light A entering the light guide member 18A is passed through the dichroic optical plane 34A and is guided to the photodetector 20 through total reflection inside of the light guide member 18A. Thus the light A is detected by the photodetector 20. While scanning of the stimulable phosphor sheet 14A along one scanning line by the stimulating rays B is conducted, the feed base 30A is moved by a distance equal to the scanning line spacing. Then, scanning by the stimulating rays B along the next scanning line is conducted. By repeating these operations, the X-ray image stored in the stimulable phosphor sheet 14A is read out sequentially.

Figure 5:
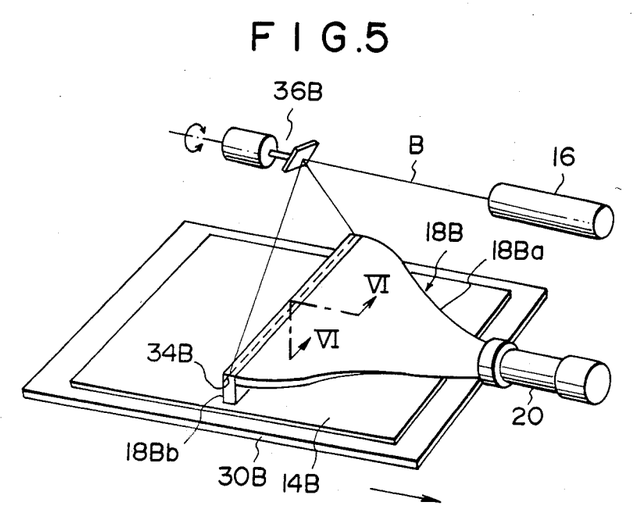
FIG. 5 is a perspective view showing another embodiment of the radiation image read-out apparatus in accordance with the present invention.
Figure 6:
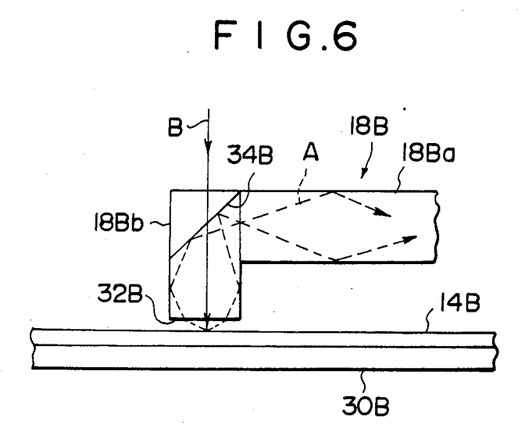
FIG. 6 is a sectional view taken along line VI—VI of FIG. 5.
Figure 7:
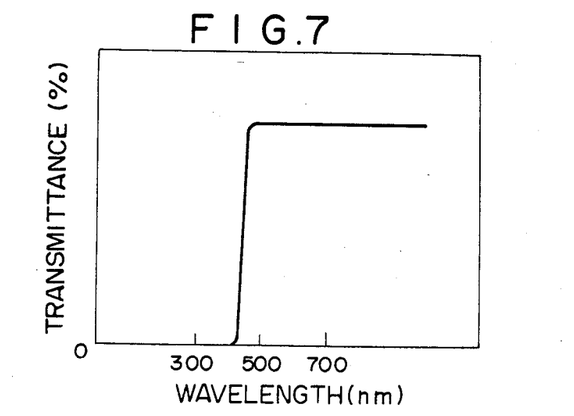
FIG. 7 is a graph showing the spectral characteristics of the dichroic optical plane in the apparatus of FIG. 5, FIGS. 8, 9 and 10 are perspective views showing further embodiments of the radiation image read-out apparatus in accordance with the present invention.

FIG. 5 is a perspective view showing another embodiment of the radiation image read-out apparatus in accordance with the present invention, and FIG. 6 is a sectional view taken along line VI—VI of FIG. 5. In this embodiment, a light guide member 18B is constituted by a sheet-like first light guide member 18Ba approximately parallel with a stimulable phosphor sheet 14B supported on a feed base 30B, and a square bar-like second light guide member 18Bb joined to one end face of the first light guide member 18Ba. A lower end face (light input face) 32B of the second light guide member 18Bb is positioned to stand face to face with the stimulable phosphor sheet 14B approximately in parallel therewith. A dichroic optical plane 34B is positioned above the light input face 32B. The dichroic optical plane 34B is fabricated to pass the stimulating rays B impinging thereupon at an angle of incidence of 45° and to reflect the light A emitted by the stimulable phosphor sheet 14B upon stimulation thereof. FIG. 7 shows the spectral characteristics of the dichroic optical plane 34B with respect to light incident at an angle of 45°.

In the embodiment of FIG. 5, the stimulating rays B emitted by the stimulating ray source 16 are swung by a light deflector 36B and are made to impinge upon the second light guide member 18Bb from above. The stimulating rays B pass through the dichroic optical plane 34B and impinge upon the stimulable phosphor sheet 14B. As shown in FIG. 6, the light A emitted by the stimulable phosphor sheet 14B when it is exposed to the stimulating rays B enters the second light guide member 18Bb from the light input face 32B, and is reflected by the dichroic optical plane 34B into the first light guide member 18Ba. The light A is then guided to the photodetector 20 through total reflection inside of the first light guide member 18Ba.

In the embodiment of FIG. 5, since the light guide member 18B can be positioned approximately in parallel with the stimulable phosphor sheet 14B, it need not be bent largely as in the case of the light guide member 18B in FIG. 2, and the apparatus can be made small.

Figure 8:
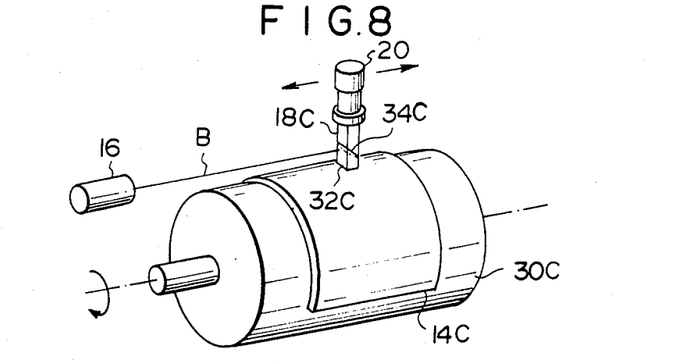
Figure 9:
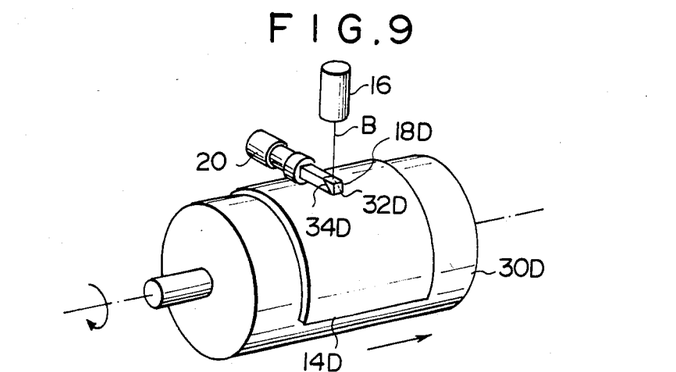

FIGS. 8 and 9 are perspective views showing further embodiments of the radiation image read-out apparatus in accordance with the present invention, wherein stimulable phosphor sheets 14C and 14D are respectively wound around and secured to cylindrical drums 30C and 30D which are rotated for scanning the stimulable phosphor sheets 14C and 14D by stimulating rays B. In FIG. 8, a long bar-like light guide member 18C is positioned in the radial direction of the drum 30C. One end face (light input face) 32C of the light guide member 18C is positioned to stand face to face with and close to the stimulable phosphor sheet 14C, and the other end (light output face) is closely contacted with the photodetector 20. The light guide member 18C is provided with a dichroic optical plane 34C exhibiting the same characteristics as those of the dichroic optical plane 34A in the embodiment of FIG. 2. The stimulating rays B are made to impinge upon the dichroic optical plane 34C in parallel with the rotation axis of the drum 30C, and are reflected by the dichroic optical plane 34C onto the stimulable phosphor sheet 14C.

In the embodiment of FIG. 8, the light guide member 18C and the photodetector 20 are together moved by a distance equal to the scanning line spacing in parallel with the rotation axis of the drum 30C as the drum 30C is rotated one turn. In this manner, the X-ray image stored in the stimulable phosphor sheet 14C is read out.

In FIG. 9, a bar-like light guide member 18D is positioned approximately horizontally in the tangential direction of a drum 30D. The lower end face (light input face) 32D of the light guide member 18D is positioned to stand face to face with and close to a stimulable phosphor sheet 14D, and the other end face (light output face) is closely contacted with the photodetector 20. The light guide member 18D is provided with a dichroic optical plane 34D exhibiting the same characteristics as those of the dichroic optical plane 34B in the embodiment of FIG. 5. The stimulating rays B are made to impinge upon the light guide member 18D from outside thereof in the radial direction of the drum 30D, and are passed through the dichroic optical plane 34D to the stimulable phosphor sheet 14D. In this embodiment, the light guide member 18D and the photodetector 20 should preferably be maintained stationary, and the drum 30D should be rotated and moved axially for achieving the scanning.

Figure 10:
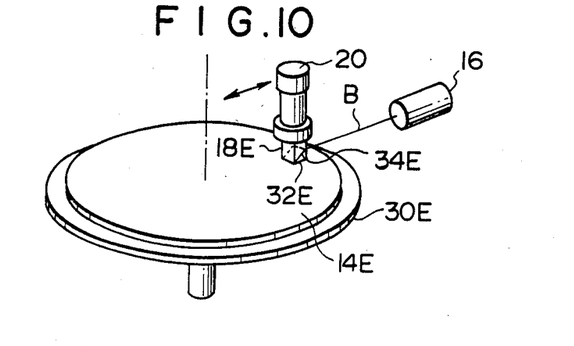

FIG. 10 is a perspective view showing a further embodiment of the radiation image read-out apparatus in accordance with the present invention, wherein a circular stimulable phosphor sheet 14E is secured to a rotatable disk 30E. A light guide member 18E and a photodetector 20 which are the same as the light guide member 18C and the photodetector 20 in FIG. 8 are moved radially on a plane on which the rotation axis of the disk 30E lies. The stimulating rays B are made to impinge upon a dichroic optical plane 34E from outside in the radial direction of the disk 30E, and are reflected by the dichroic optical plane 34E. Thus the stimulating rays B are made to impinge upon the stimulable phosphor sheet 14E via an end face (light input face) 32E of the light guide member 18E standing face to face with the stimulable phosphor sheet 14E.

In the embodiments of FIGS. 8, 9 and 10, since the shapes of the light guide members 18C, 18D and 18E are simple, they can be formed and processed easily.

From the viewpoint of forming and processing, the light input faces 32A to 32E of the light guide members 18A to 18E should preferably be flat planes parallel with the surfaces of the stimulable phosphor sheets 14A to 14E. However, in order to improve the efficiency for guiding the light A emitted by the stimulable phosphor sheets 14A to 14E, the light input faces 32A to 32E may be provided with a reflection preventing film for preventing reflection of light having a wavelength within the wavelength range of the light A emitted by the stimulable phosphor sheets 14A to 14E, or may be formed as curved faces. Also, instead of incorporating the dichroic optical planes 34A to 34E within the light guide members 18A to 18E, the dichroic optical planes 34A to 34E may be overlaid on a transparent sheet positioned in the optical path between two light guide members spaced apart from each other.

Figure 11:
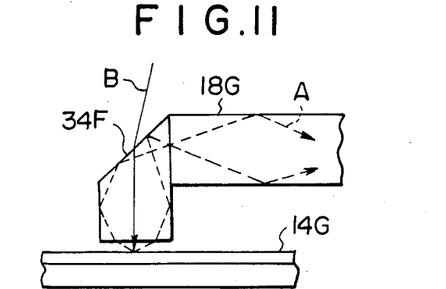
FIGS. 11 and 12 are sectional views showing major parts of still further embodiments of the radiation image read-out apparatus in accordance with the present invention.
Figure 12:
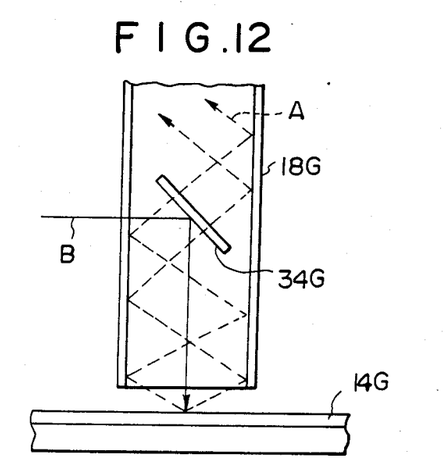

FIGS. 11 and 12 are sectional views showing major parts of still further embodiments of the radiation image read-out apparatus in accordance with the present invention.

In FIG. 11, a portion of a light guide member 18F above the light emitting portion of a stimulable phosphor sheet 14F is cut obliquely, and a dichroic optical plane 34F for passing stimulating rays B is overlaid on the cut surface.

FIG. 12 is a sectional view showing a major part of a still further embodiment of the radiation image read-out apparatus in accordance with the present invention. In this embodiment, a light guide member 18G is fabricated of two opposing sheets or of a cylinder. The inner surfaces of the light guide member 18G are optically treated so that they are permeable to the stimulating rays B and reflect the light A emitted by a stimulable phosphor sheet 14G. A dichroic optical plane 34G is positioned inside of the light guide member 18G. The stimulating rays B pass through the light guide member 18G and are reflected by the dichroic optical plane 34G onto the stimulable phosphor sheet 14G. On the other hand, the light A emitted by the stimulable phosphor sheet 14G is reflected by the inner surfaces of the light guide member 18G and is guided to a photodetector (not shown). In this case, a light input face 32G of the light guide member 18G may be open to the stimulable phosphor sheet 14G. It is of course possible to fabricate the light guide member 18G by use of a transparent member and to optically treat the outer surfaces of the light guide member 18G so that they are permeable to the stimulating rays B and reflect the light A emitted by the stimulable phosphor sheet 14G.

We claim:

1. A radiation image read-out apparatus provided with a stimulating ray optical system for exposing a stimulable phosphor carrying a radiation image stored therein to stimulating rays, a photodetector for detecting light emitted by the stimulable phosphor upon exposure to said stimulating rays, and a light guide member for guiding the emitted light to said photodetector, said light guide member having one end face positioned close to the stimulable phosphor and the other end face optically connected to said photodetector, wherein the improvement comprises:

(i) positioning a dichroic optical plane, which selectively reflects either said stimulating rays or said light emitted by the stimulable phosphor and selectively passes the other, in an optical path of said light guide member, and (ii) positioning said stimulating ray optical system so that said stimulating rays directly impinge upon said dichroic optical plane and come out of said one end face of said light guide member positioned close to the stimulable phosphor by being reflected by said dichroic optical plane or by passing therethrough, thereby stimulating the stimulable phosphor.

2. An apparatus as defined in claim 1 wherein said light guide member has a generally bent shape, and said dichroic optical plane is positioned inside of said light guide member at an angle of 45° with respect to said one end face of said light guide member positioned close to the stimulable phosphor.

3. An apparatus as defined in claim 1 wherein said light guide member is constituted by a sheet-like first light guide member and a square bar-like second light guide member joined to an end face of said first light guide member, a lower end face of said second light guide member being positioned to stand face to face with and close to the stimulable phosphor, and said dichroic optical plane is positioned above said lower end face of said second light guide member at an angle with respect thereto.

4. An apparatus as defined in claim 1 wherein said stimulable phosphor is secured to a cylindrical drum, and said light guide member has a long bar-like shape, said light guide member being positioned in the radial direction of said drum and moved in parallel with the rotation axis of said drum.

5. An apparatus as defined in claim 1 wherein said stimulable phosphor is secured to a cylindrical drum, and said light guide member has a long bar-like shape and is positioned in the tangential direction of said drum, said drum being rotated and moved in the direction of the rotation axis thereof.

6. An apparatus as defined in claim 1 wherein said stimulable phosphor has a circular shape and is secured to a rotatable disk, and said light guide member is moved in the radial direction of said disk on a plane on which the rotation axis of said disk lies.

7. An apparatus as defined in claim 1 wherein said light guide member is fabricated of two sheets standing face to face with each other and treated so that the light guide member is permeable to said stimulating rays and reflects said light emitted by the stimulable phosphor, and said dichroic optical plane is positioned inside of said light guide member.

8. An apparatus as defined in claim 1 wherein said light guide member is fabricated of a cylinder and is treated so that it is permeable to said stimulating rays and reflects said light emitted by the stimulable phosphor, and said dichroic optical plane is positioned inside of said light guide member.

* * * * *